United States Patent
Kakui et al.

(10) Patent No.: US 6,327,412 B1
(45) Date of Patent: Dec. 4, 2001

(54) OPTICAL FIBER, LIGHT-EMITTING MODULE, AND OPTICAL FIBER AMPLIFIER

(75) Inventors: Motoki Kakui; Shinji Ishikawa; Takashi Sasaki, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/445,086
(22) PCT Filed: Apr. 19, 1999
(86) PCT No.: PCT/JP99/02067
  § 371 Date: Dec. 2, 1999
  § 102(e) Date: Dec. 2, 1999
(87) PCT Pub. No.: WO99/54765
  PCT Pub. Date: Oct. 28, 1999

(30) Foreign Application Priority Data

Apr. 22, 1998 (JP) .................................................. 10-112209

(51) Int. Cl.[7] .................................. G02B 6/02; H01S 3/00
(52) U.S. Cl. ........................... 385/126; 385/123; 385/27; 385/28; 385/141; 359/341
(58) Field of Search ................................. 385/27, 28, 31, 385/38, 123, 126, 127, 141, 146; 359/341

(56) References Cited

U.S. PATENT DOCUMENTS

| 4,818,062 | * | 4/1989 | Scifres et al. | 385/38 X |
| 5,363,385 | * | 11/1994 | Heidemann | 372/6 |
| 5,461,692 | * | 10/1995 | Nagel | 385/127 |
| 5,568,577 | | 10/1996 | Hardy, Jr. et al. | 385/33 |

FOREIGN PATENT DOCUMENTS

| 62-89003 | 4/1987 | (JP) | 385/123 X |
| 3-238883 | 10/1991 | (JP) | 385/123 X |
| 4-322228 | 11/1992 | (JP) | 385/123 X |
| 6-18750 | 1/1994 | (JP) | 385/123 X |

(List continued on next page.)

OTHER PUBLICATIONS

"High Brightness Fiber Coupled Laser Diodes", Mitsui Petrochemical Industries, Ltd., May 1997.
"High Power 980 nm Laser", Applied Optronics Corp., AOC 980–1200–HHL200.
"High Power, 915 nm, High Reliability Pump Module", Preliminary Products, SDLO–4000 Series.

(List continued on next page.)

Primary Examiner—Brian Healy
(74) Attorney, Agent, or Firm—McDermott, Will & Emery

(57) ABSTRACT

An optical fiber amplifier comprises an amplifying optical fiber 60 for optically amplifying signal light according to pumping light incident thereon, a semiconductor light-emitting device 10 for emitting the pumping light; a light-collecting optical system 30 for collecting the pumping light; and waveguide optical fibers 20 to 22 for guiding light through core regions to the amplifying optical fiber, in which the waveguide optical fibers 20 to 22 are disposed such that a maximum width direction of the core region at an input face thereof aligns with a maximum width direction of an incident beam, and the maximum width D [$\mu$m] of the core region at the input face satisfies $$\frac{L\sin\theta}{NA} \leq D \leq L$$

where NA is the numerical aperture, L [$\mu$m] is the maximum width of a light-emitting region of the semiconductor light-emitting device 10, and $\theta$ is the output divergent angle of the emitted light in the maximum width direction of the light-emitting region.

19 Claims, 6 Drawing Sheets

FOREIGN PATENT DOCUMENTS

| | | | |
|---|---|---|---|
| 6-69584 | 3/1994 | (JP) | 385/123 X |
| 6-92683 | 4/1994 | (JP) | 385/123 X |
| 6-69913 | 9/1994 | (JP) | 385/38 X |
| 7-64021 | 3/1995 | (JP) | 385/38 X |
| 7-168024 | 7/1995 | (JP) | 385/38 X |
| 7-301763 | 11/1995 | (JP) | 385/11 X |
| 8-222817 | 8/1996 | (JP) | 385/33 X |
| 9-5552 | 1/1997 | (JP) | 385/123 X |
| 10-56227 | 2/1998 | (JP) | 385/123 X |
| 10-90547 | 4/1998 | (JP) | 385/38 X |
| 96/04700 | 2/1996 | (WO) | 385/126 X |

OTHER PUBLICATIONS

"High Power Fiber–Coupled LD", MLD–1000–F, MLD 3000–F, Mitsui Chemicals, May 1998.

"23 dBm Output Power Er/Yb Co–Doped Fiber Amplifier for WDM Signals in the 1575–1605 nm Wavelength Region", by Pasquale et al.

* cited by examiner

OPTICAL FIBER, LIGHT-EMITTING MODULE, AND OPTICAL FIBER AMPLIFIER

TECHNICAL FIELD

The present invention relates to an optical fiber for receiving light emitted from a semiconductor light-emitting device and guiding thus received light, a light-emitting module comprising this optical fiber and the semiconductor light-emitting device, and an optical fiber type optical amplifier, which is named as optical fiber amplifier, using this light-emitting optical module.

BACKGROUND ART

As an apparatus for amplifying signal light in optical communications, an optical fiber amplifier has been known. As disclosed in each of Japanese Patent Application Laid-Open No. HEI 10-56227 and Japanese Patent Application Laid-Open No. HEI 10-90547, such an optical fiber amplifier is configured such that signal light is propagated through an amplifying optical fiber doped with a rare-earth element; and pumping light, having a predetermined wavelength different from that of the signal light and causing the doped rare earth to release light having a wavelength identical to that of the signal light, is input into the amplifying optical fiber from both ends thereof, so as to amplify the signal light.

Semiconductor light-emitting devices such as light-emitting diode (LED) and laser diode (LD) are in common use for the pumping light source. The light emitted from one such semiconductor light-emitting devices is guided to the amplifying optical fiber by a waveguide optical fiber.

In general, the output face of the light-emitting region (active region) of a semiconductor light-emitting device has a rectangular form, and the length L of the longer side of the output face of the light-emitting region is longer as its optical output power is greater. As the semiconductor light-emitting device favorably usable for the pumping light source, those having an L of 100 $\mu$m or 50 $\mu$m and the like have been known. In order to favorably guide the light emitted from such a kind of semiconductor light-emitting device to a waveguide optical fiber, while facilitating the positional adjustment between the semiconductor light-emitting device and the optical fiber, it has conventionally been a common practice to make the core diameter D of the waveguide optical fiber not shorter than the length L of the longer side of the output face of the light-emitting region of the semiconductor light-emitting device (see catalogs of LD modules MLD100-FC and MLD300-FC manufactured by Mitsui Chemicals, Inc., catalog of LD module AOC980-120-HHL200 manufactured by Applied Optics Corp., and catalog of LD module SDLO-4000 manufactured by SDL, Inc., for example).

DISCLOSURE OF THE INVENTION

In such an optical fiber amplifier, it is required that not only the light incident on the waveguide optical fiber and guided thereby have a high power, but also the optical power per unit cross-sectional area in its core region, i.e., light intensity, be high. Conventionally, however, the light intensity has not been sufficient since the core diameter D of the waveguide optical fiber is large, though the power of light incident on and guided by the optical fiber has been high. As a consequence, in such a conventional optical fiber amplifier employing a semiconductor light-emitting device and a waveguide optical fiber, even when a semiconductor light-emitting device having a high optical output power is used, since the light intensity of the guided pumping light is insufficient, the pumping efficiency of the element to be excited in the amplifying optical fiber is low, thus yielding a low optical amplification factor.

In view of such a problem, it is an object of the present invention to provide an optical fiber which can guide light having a sufficient light intensity and optical output power, a light-emitting module using the same, and an optical fiber amplifier using this light-emitting module.

For achieving the above-mentioned object, the optical fiber in accordance with the present invention is characterized in that a core cross section at an end face has a maximum width of 50 $\mu$m or less, and the product of this maximum width and a numerical aperture thereof is 5.2 $\mu$m or greater.

The inventors have studied conditions to be satisfied by the optical fiber in order to transmit light having a high output power therethrough with a high light intensity. Then, the inventors have found it preferable to reduce the core diameter D while keeping the coupling efficiency with respect to the light source on the entrance side substantially at 100%. Even when the beam diameter of the light incident on the optical fiber end face is made narrower than the core diameter D, light having a higher mode number cannot be guided through the optical fiber unless the core diameter and the numerical aperture satisfy a predetermined relationship therebetween, whereby the coupling efficiency will deteriorate accordingly. Also, increasing the core diameter in excess is unfavorable since it decreases the light intensity. The inventors have found that, when application to an optical fiber amplifier or the like is taken into consideration, the core diameter preferably should not exceed 50 $\mu$m from the viewpoints of matching with the amplifying optical fiber, maintenance of light intensity, and the like, and that the incident high-output beam can be guided with a high coupling efficiency while maintaining a high light intensity when the core diameter is set to the above-mentioned range. When this optical fiber is utilized as an optical fiber for guiding pumping light in the optical fiber amplifier, pumping light having a high output and high intensity can be guided to the amplifying optical fiber, whereby the efficiency of amplification can be enhanced. In particular, when a high-output LD or the like is used as the light source, substantially the whole light emitted from the LD can be guided to the core portion and transmitted therethrough while maintaining a high light intensity.

Alternatively, the optical fiber in accordance with the present invention is characterized in that it has two core portions, the product of the maximum width of a core cross section at an end face and a numerical aperture thereof being 2.6 $\mu$m or less in each of the core portions, the two core portions being provided with respective cladding portions independent from each other at one end thereof, and at the other end thereof the two core portions being disposed at least near or adjacent to each other and provided with a common cladding portion, the maximum distance between outer peripheries of the two core portions being 50 $\mu$m or less.

Also in this optical fiber, a high-output light beam can be input therein from the side where the core portions are disposed near each other, so as to be split into two, whereby the light beams having a high output power and high intensity can be emitted to both of branched end faces. If this optical fiber is used as the waveguide optical fiber in the optical fiber amplifier, then, while using a single semiconductor laser as its pumping light source, the pumping light incident on the optical fiber from its unified one end can easily be guided to both ends of the amplifying optical fiber, whereby the efficiency of amplification can be enhanced. When a high-output LD or the like is used as the light source, substantially the whole light emitted from the LD can be guided to the core portions and transmitted therethrough while maintaining a high light intensity.

On the other hand, the light-emitting module in accordance with the present invention comprises a semiconductor light-emitting device for emitting light having a predetermined wavelength; a light-collecting optical system for collecting the light emitted from the semiconductor light-emitting device; and an optical fiber for receiving the light guided by the light-collecting optical system, guiding thus received light through a core region, and emitting thus guided light, the optical fiber being disposed such that a maximum width direction of the core region at an input face thereof aligns with a maximum width direction of an incident beam, the maximum width D [$\mu$m] of the core region at the input face being not greater than the maximum width L [$\mu$m] of a light-emitting region of the semiconductor light-emitting device.

In this light-emitting module, the light beam emitted from the semiconductor light-emitting device is input into the optical fiber while being narrowed by the light-collecting optical system, whereby the light beam can be guided with a high light intensity.

Further, letting NA be the numerical aperture of the optical fiber, and $\theta$ be the output divergent angle of the emitted light in the maximum width direction of the light-emitting region of the semiconductor light-emitting device, it is preferred that the following equation:

$$\frac{L\sin\theta}{NA} \leq D \qquad (1)$$

be satisfied. When the maximum width D of the core region of the optical fiber is set to the range of equation (1), then all the modes of light emitted from the semiconductor light-emitting device can be introduced into the optical fiber and guided therethrough. As a consequence, a high-output beam emitted from the semiconductor light-emitting device can be introduced into the optical fiber with a low loss and can be guided therethrough with a high light intensity.

Also, the optical fiber amplifier in accordance with the present invention comprises an amplifying optical fiber for optically amplifying signal light according to pumping light incident thereon; a semiconductor light-emitting device for emitting the pumping light; a light-collecting optical system for collecting the light emitted from the semiconductor light-emitting device; and a waveguide optical fiber for receiving the light guided by the light-collecting optical system and guiding thus received light through a core region to the amplifying optical fiber, the waveguide optical fiber being disposed such that a maximum width direction of the core region at an input face thereof aligns with a maximum width direction of an incident beam, the maximum width D [$\mu$m] of the core region at the input face being not greater than the maximum width L [$\mu$m] of a light-emitting region of the semiconductor light-emitting device. Preferably, the waveguide optical fiber satisfies equation (1).

The optical fiber amplifier in accordance with the present invention uses the above-mentioned light-emitting module in accordance with the present invention as its pumping light source, and can achieve a high efficiency of amplification since it can introduce pumping light having a high light intensity and optical output power into the amplifying optical fiber.

Preferably, the amplifying optical fiber has a double cladding segment, and D'×NA'≧D×NA where D' [$\mu$m] is the diameter of the inner cladding, and NA' is its numerical aperture.

In this case, all the modes of light in the pumping light emitted from the waveguide optical fiber are introduced into the inner cladding region of the amplifying optical fiber, so that the efficiency of utilization of pumping light is high, whereby the efficiency of amplification can be enhanced.

The present invention will become more fully understood from the detailed description given hereinbelow and the accompanying drawings. They are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

BEST MODE FOR CARRYING OUT THE INVENTION

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

Figure 1:
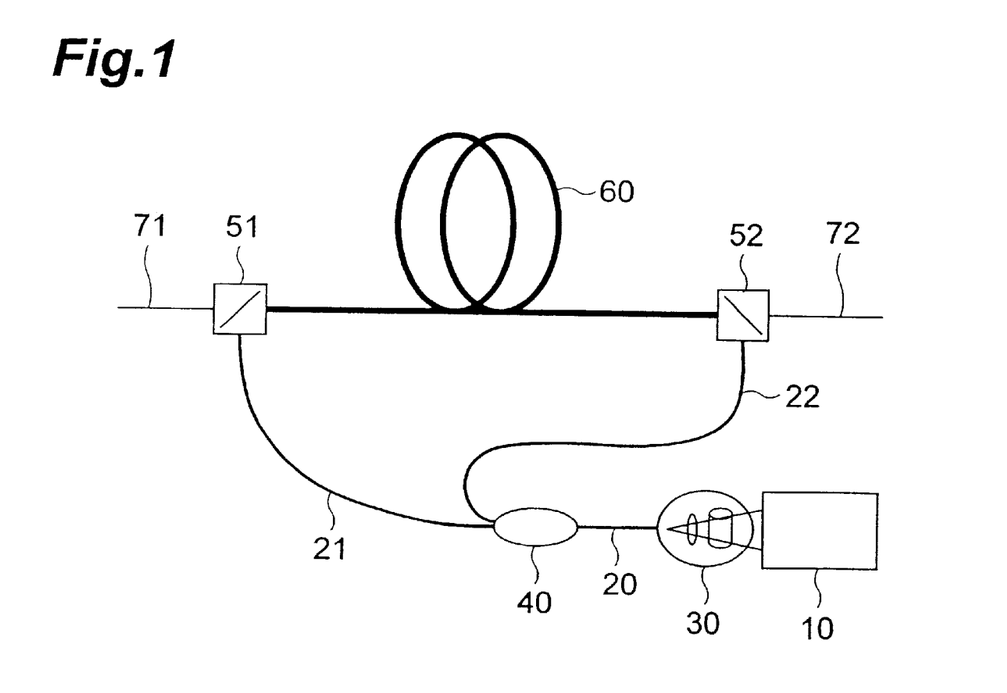
FIG. 1 is a configurational view showing a first embodiment of the optical fiber amplifier in accordance with the present invention.

FIG. 1 is a configurational view showing a first embodiment of the optical fiber amplifier in accordance with the present invention. This optical fiber amplifier comprises a semiconductor light-emitting device 10, a light-collecting lens system 30, waveguide optical fibers 20, 21, 22, a 3-dB coupler 40, WDM couplers 51 and 52, and an amplifying optical fiber 60. This optical fiber amplifier supplies pumping light to the amplifying optical fiber 60, optically amplifies signal light inputted to the amplifying optical fiber 60 from an optical fiber 71 upon bidirectional pumping, and outputs thus optically amplified signal light to an optical fiber 72.

Figure 2:
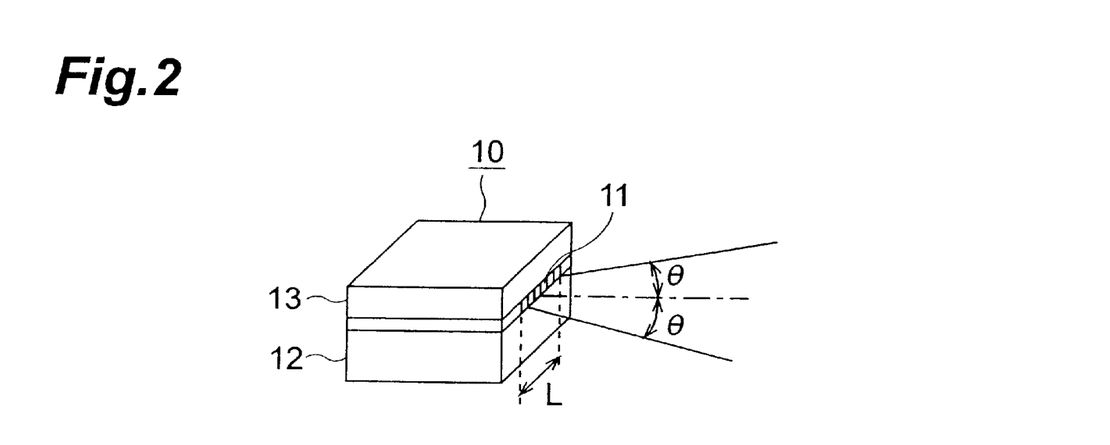
FIG. 2 is a configurational view of the semiconductor light-emitting device used in the apparatus of FIG. 1.

The semiconductor light-emitting device 10 is a light-emitting diode (LED) or laser diode (LD), and has a configuration in which, as shown in FIG. 2, a light-emitting region 11 is held between cladding layers 12 and 13, so as to emit pumping light having a wavelength $\lambda$ [$\mu$m] from the output face of the light-emitting region 11. As shown in this drawing, the output face of the light-emitting region 11 has a rectangular form. The length of its longer side will be indicated by L [$\mu$m] in the following. Also, the light is emitted with a divergent angle of $\theta$ in the maximum width direction. In general, the length L of the longer side of the output face of the light-emitting region 11 is known to become longer as its optical output power is higher.

Figure 3A:
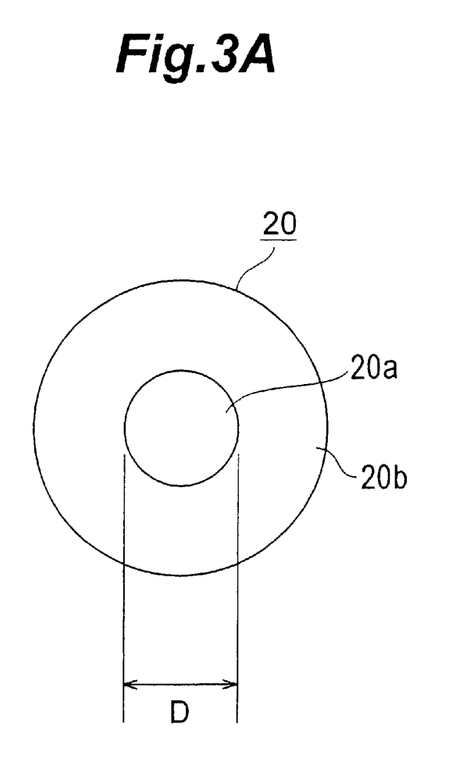
FIGS. 3A to 3C are views showing respective end faces of optical fibers in accordance with the present invention for guiding pumping light used in the apparatus of FIG. 1.

On the other hand, the optical fiber 20, as its cross-sectional form is shown in FIG. 3A, for example, has a core region 20a and a cladding region 20b. As shown in FIG. 3A, the cross section of the core region 20a is substantially circular, and its diameter will be indicated by D [$\mu$m] in the following. The optical fiber 20 lets the light emitted from the semiconductor light-emitting device 10 and collected by the light-collecting lens system 30 enter the input face, and causes the core region 20a to guide this light.

Figure 3B:
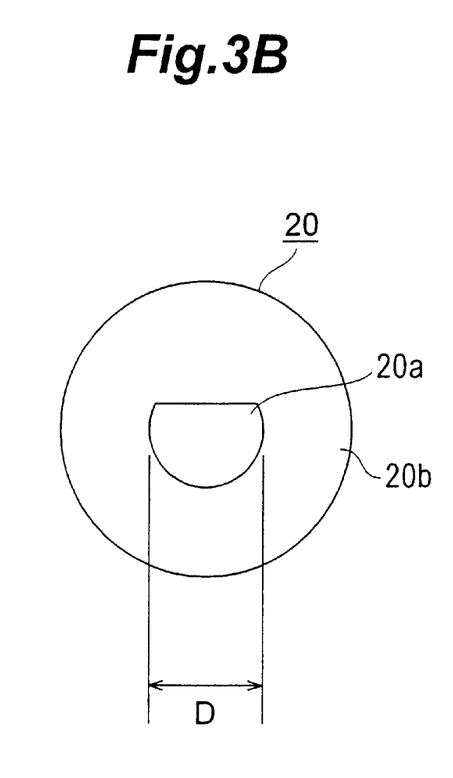
Figure 3C:
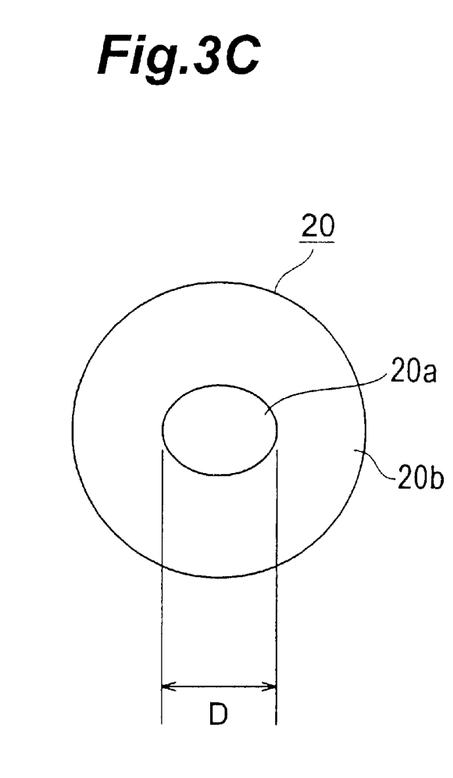

Here, the core region 20a of the optical fiber 20 is not needed to be perfectly circular as shown in FIG. 3A, but may be formed like a partly cut circle as shown in FIG. 3B or an ellipse as shown in FIG. 3C. If the core region 20a is not perfectly circular, then its maximum width is referred to as the diameter D. Also, if the light beam input into the end face is not perfectly circular, then the light-emitting device 10, the light collecting lens system 30, and the optical fiber 20 are arranged such that the maximum width direction of the core region 20a aligns with the maximum width direction of the beam.

First, letting L' [$\mu$m] be the maximum width of the light beam outputted from the light collecting lens system 30, the optical fiber amplifier in accordance with the first embodiment is characterized in that the following equation:

$$L' \leq D \leq L \qquad (2)$$

holds true. As a consequence, even when the length L of the longer side of the output face of the light-emitting region 11 in the semiconductor light-emitting device 10 is large and the optical output power is high, the light emitted from the semiconductor light-emitting device 10 can be collected so as to be input into the optical fiber 20 efficiently, and the light intensity in the optical fiber 20 can be made sufficient.

Here, the maximum value $Nf_{max}$ of the mode number of light which can be guided through the optical fiber 20 is proportional to the product of the core diameter D and the numerical aperture NA as indicated by the following equation:

$$Nf_{max} \approx \frac{D \times NA}{\lambda} \qquad (3)$$

Here, letting $n_1$, be the refractive index of the core region 20a, and $n_2$ be the refractive index of the cladding region 20b, the numerical aperture NA is represented by equation $$NA = \sqrt{n_1^2 - n_2^2}.$$

On the other hand, the maximum value $Nl_{max}$ of the mode number of light concerning the maximum width direction of the output face of the light-emitting region 11 in the semiconductor light-emitting device 10 is proportional to the maximum width L and a function sin $\theta$ of the divergent angle in the maximum width direction as indicated by the following equation:

$$Nl_{max} \approx \frac{L \sin \theta}{\lambda} \qquad (4)$$

Therefore, as long as $Nf_{max} \geq Nl_{max}$ holds true, all the modes included in the light emitted from the semiconductor light-emitting device 10 can be guided through the optical fiber 20, whereby the efficiency of incidence can become nearly 100% in principle. This condition is satisfied when the above-mentioned equation (1):

$$\frac{L \sin \theta}{NA} \leq D$$

holds true. When the core diameter D satisfying both of equations (2) and (1) at the same time is set, then, even if the light input into the optical fiber 20 from the semiconductor light-emitting device 10 so as to be guided has a high power, the light having a sufficient light intensity can be guided with a low loss.

For example, suppose that a semiconductor light-emitting device 10 (MLD300 manufactured by Mitsui Chemicals, Inc.) in which the length L of the longer side of the output face of the light-emitting region 11 is 50 $\mu$m and the divergent angle $\theta$ of the emitted light in its maximum width direction is 6 degrees is used as the semiconductor light-emitting device 10. On the other hand, if the optical fiber 20 is assumed to be of silica type which is the most common, then the relative refractive index difference of the core region 20a with respect to the cladding region 20b can be enhanced to about 2% by adding Ge (germanium) element to the core region 20a and F (fluorine) element to the cladding region 20b.

In this case, the numerical aperture NA of the optical fiber 20 becomes 0.29, whereby it can be seen from equation (1) that the core diameter D of the optical fiber 20 can be reduced to about 18 $\mu$m. In this case, the light intensity in the core region 20a of the optical fiber 20 becomes about eight times as high as the light intensity in the core region of the optical fiber in a conventional apparatus having a core diameter equal to the length L of the longer side of the output face of the light-emitting region 11.

For this MLD300 manufactured by Mitsui Chemicals, Inc., equation (1) can be modified as $D \times NA \geq 5.2$ $\mu$m. Since the numerical aperture NA can be increased to about 0.46 by refractive index adjustment, the core diameter D can be reduced to 11.3 $\mu$m in this case, whereby a higher light intensity can be achieved.

The 3-dB coupler 40 connected to this optical fiber 20 can split the pumping light guided through the optical fiber 20 into two, which are then guided to the optical fibers 21 and 22, respectively. The optical fibers 21, 22 have a configuration identical to that of the optical fiber 20. Namely, the core diameter D of each of them satisfies equations (1), (2).

The WDM coupler 51 causes the signal light having arrived there after being guided through the optical fiber 71 and the pumping light having arrived there after being guided through the optical fiber 21 to enter the amplifying optical fiber 60. The WDM coupler 52 causes the signal light optically amplified by the amplifying optical fiber 60 to enter the optical fiber 72, and the pumping light having arrived there after being guided through the optical fiber 22 to enter the amplifying optical fiber 60 in the direction opposite to this signal light.

Figure 4:
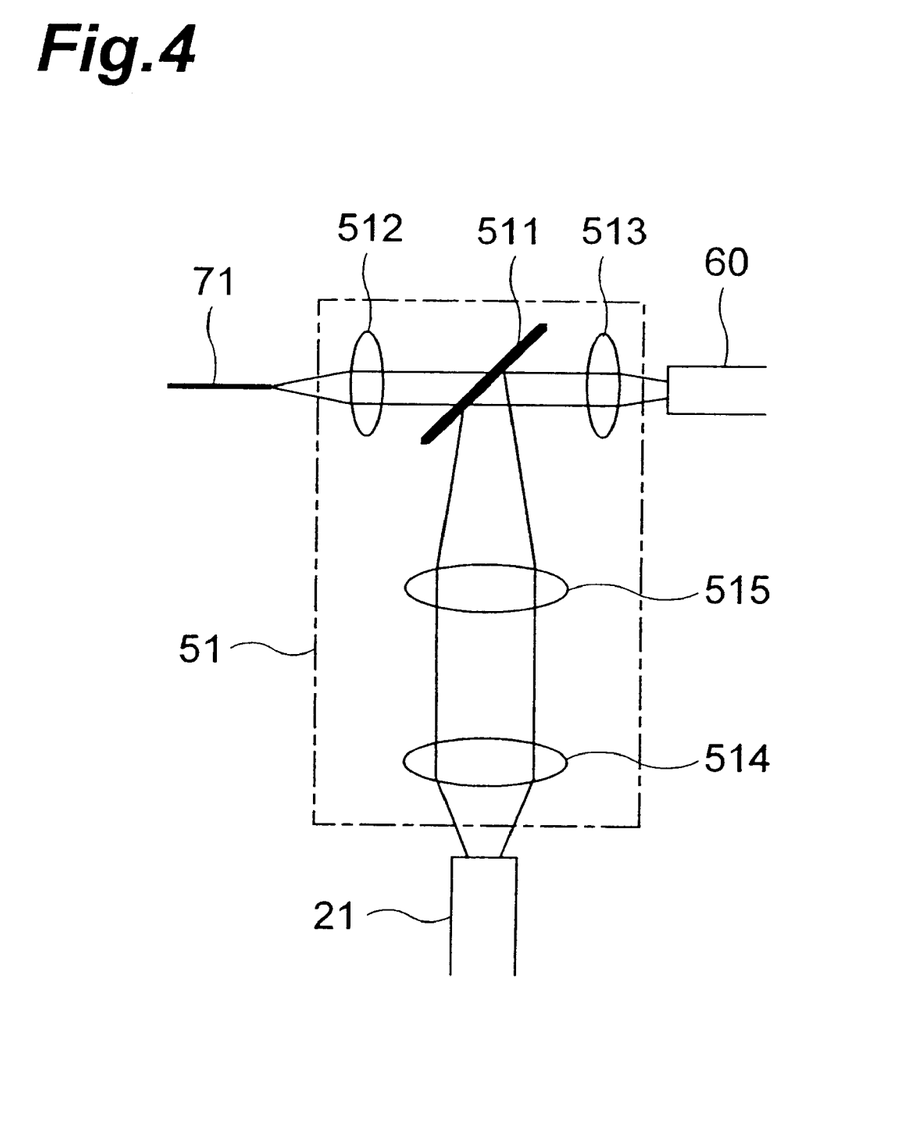
FIG. 4 is a view showing the configuration of a WDM coupler in the apparatus of FIG. 1.

As shown in FIG. 4, the WDM coupler 51 comprises a filter 511 and lenses 512 to 515. The filter 511 reflects the pumping light emitted from the optical fiber 21 and transmits therethrough the signal light emitted from the optical fiber 71. Though the signal light having arrived after being guided through the optical fiber 71 diverges when emitted from the output face of the optical fiber 71, it is collected by the lenses 512 and 513, so as to be input into the signal light waveguide region of the input face of the amplifying optical fiber 60. On the other hand, though the pumping light having arrived after being guided through the optical fiber 21 diverges when emitted from the output face of the optical fiber 21, it is collected by the lenses 514, 515, and 513, so as to be input into the pumping light waveguide region of the input face of the amplifying optical fiber 60. The WDM coupler 52 is similar to the WDM coupler 51.

Figure 5:
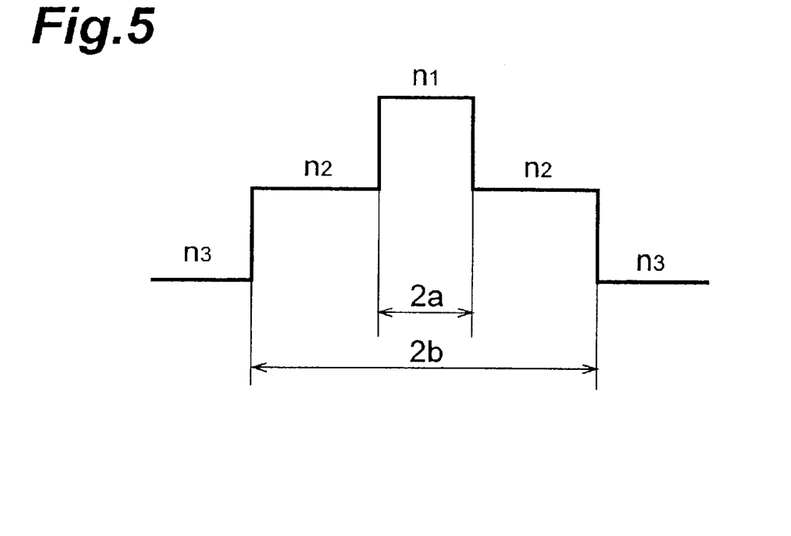
FIG. 5 is a view for explaining the refractive index profile of the amplifying optical fiber in the apparatus of FIG. 1.

The amplifying optical fiber 60 is a silica type optical fiber in which a rare earth element such as Er (erbium) element, Nd (neodymium) element, Pr (praseodymium) element, or the like is added to at least a core region, and has a double cladding type refractive index profile such as that shown in FIG. 5. The amplifying optical fiber 60 is a double cladding type optical fiber having a core region with an outside diameter $2a$ and a refractive index $n_1$ located at the center thereof, a first cladding region with an outside diameter $2b$ and a refractive index $n_2$ located outside the core region, and a second cladding region with a refractive index $n_3$ located outside thereof. The respective refractive indices $n_1$ to $n_3$ of the individual regions have the following relationship:

$$n_1 > n_2 > n_3 \quad (5)$$

therebetween. The core region of the amplifying optical fiber 60 constitutes the signal light waveguide region for guiding the signal light, whereas the core region and the first cladding region constitute the pumping light waveguide region for guiding the pumping light. Here, letting NA' ($NA' = \sqrt{n_1^2 - n_2^2}$) be the numerical aperture of the first cladding region in the amplifying optical fiber 60, it is preferred that the following equation:

$$2b \times NA' \geq D \times NA \quad (6)$$

be satisfied. In this case, the maximum mode number of light which can be guided through the first cladding region in the amplifying optical fiber 60 becomes greater than the maximum mode number of light which can be guided through the optical fibers 20 to 22, whereby the pumping light is efficiently introduced from the optical fibers 21, 22 into the amplifying optical fiber 60 in the WDM couplers 51, 52. On the other hand, it will be unfavorable if the diameter $2b$ of the first cladding region in the amplifying optical fiber 60 is made much greater than the diameter D of the optical fibers 20 to 22, since the light intensity of the pumping light will be decreased thereby. Preferably, the diameter $2b$ of the first cladding region is 50 μm or less. Also, it is preferred that the diameter $2b$ of the first cladding region in the amplifying optical fiber 60 and the diameter D of the optical fibers 20 to 22 substantially equal each other, since it is unfavorable to yield a large difference between their numerical apertures from the viewpoint of adjusting optical systems and the like.

The results of studies concerning the power of supplied pumping light and the power of outputted signal light in such an optical fiber amplifier will now be explained. Various conditions were set as follows. As the amplifying optical fiber 60, one in which 1000 wt-ppm of Er element and 5 wt % of Al (aluminum) element had been added to its core region was used. The diameter $2a$ of the core region of the amplifying optical fiber 60 was set to 8.2 μm. The diameter $2b$ of the first cladding region in the amplifying optical fiber 60, and the core diameter D of each of the optical fibers 20 to 22 was identically set to 25 μm or 50 μm. Further, for comparison, the case where a single-mode optical fiber (SMF) in which the pumping light attained a single mode was used in place of the optical fibers 20 to 22 was studied as well. The wavelength of pumping light was set to 980 nm, and the powers of pumping light supplied to the amplifying optical fiber 60 respectively by way of the WDM couplers 51 and 52 were set identical to each other. The wavelength of signal light was set to 1560 nm, whereas the input power of signal light was set to 0 dBm.

Figure 6:
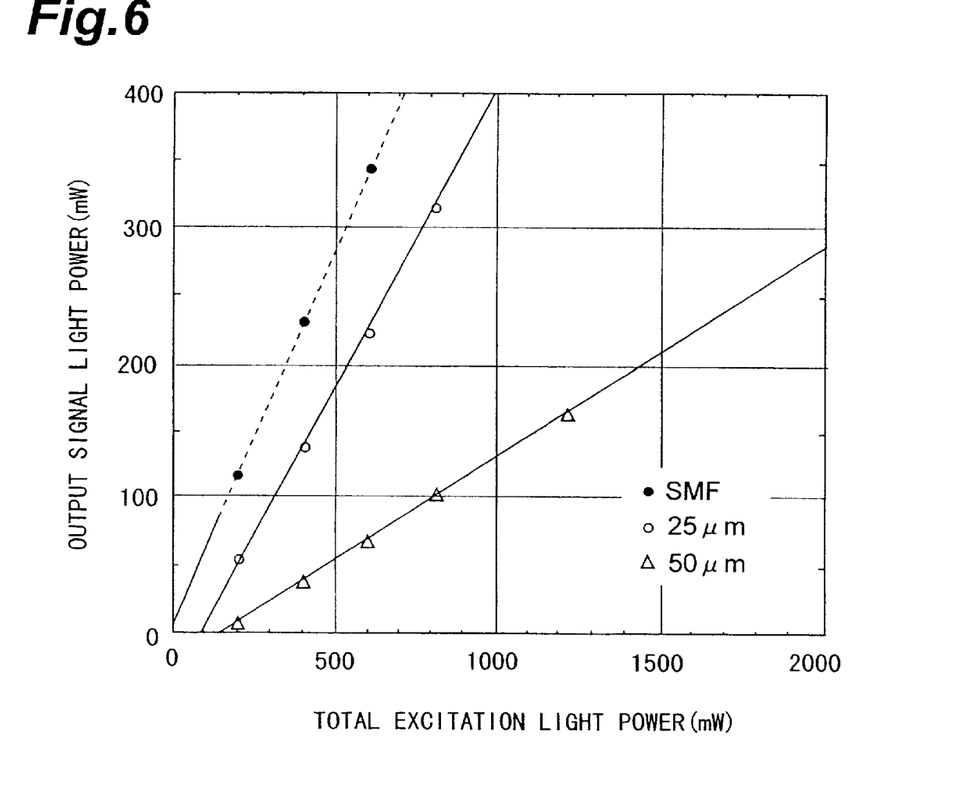
FIG. 6 is a graph showing the results of studies concerning the relationship between supplied pumping light power and outputted signal light power in the apparatus of FIG. 1.

FIG. 6 shows, as a graph, the results of studies concerning the relationship between the power of pumping light supplied to the optical fiber amplifier and the power of signal light outputted therefrom under the above-mentioned conditions.

As can be seen from this graph, the pumping efficiency and the pumping threshold were better as the core diameter D of the optical fibers 20 to 22 was smaller, and the best when the SWM was used. However, since the power of pumping light was limited to about 150 mW or less in semiconductor light-emitting devices capable of emitting single-mode pumping light, the power of outputted signal light was limited to about 100 mW or less as shown in FIG. 6. Therefore, for further increasing the power of outputted signal light, it is necessary that multimode light be introduced as pumping light. Also, for enhancing the output of the semiconductor light-emitting device 10, the width of the light-emitting region is needed to broaden.

In the optical fiber amplifier in accordance with the present invention, due to the fact that the core diameter D was greater than that in the SMF as well, the output signal was lower than that in the case where the SMF was used if the pumping light power is the same. However, the semiconductor light-emitting device 10 emitting multimode light can attain a higher output, thus being able to yield an pumping light power exceeding 1000 mW as well. If the semiconductor light-emitting devices 10 having optical powers of about 850 mW and about 300 mW are obtained when the waveguide optical fibers having core diameters D of 50 μm and 25 μm are used, respectively, then an output signal power of 100 mW or greater which is hard to attain when using the SMF will be obtained. It has further been seen that an output signal at 400 mW can be obtained when a waveguide optical fiber having a D of 25 μm is used while the output power of the semiconductor light-emitting device 10 is set to 1000 mW.

Thus, it has been confirmed that a high amplification output which has not conventionally existed can be obtained by the optical fiber amplifier in accordance with the present invention when pumping light having a high output and high intensity is guided therethrough.

Figures 7A, 7B:
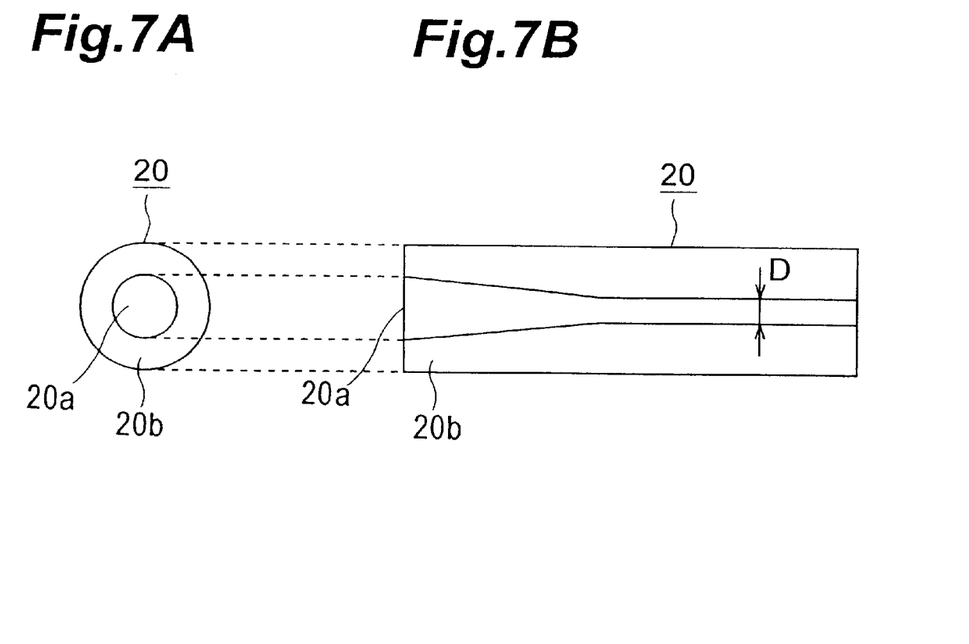
FIGS. 7A and 7B are views showing an end face and vertical cross-sectional structure of another mode of the optical fiber in accordance with the present invention, respectively.

It is not necessary for the optical fiber 20 to have a constant core diameter over the whole length, and the core region 20a of the optical fiber 20 can be expanded near the input face as shown in FIGS. 7A and 7B. Such expansion of the core region near the input face of the optical fiber 20 can be achieved by heating the input face with a burner. In this optical fiber 20, if the diameter D of the original core region before expansion satisfies the above-mentioned requirements, then the diameter of the expanded core region near the input face will also satisfy the above-mentioned requirements. When such an optical fiber 20 is used, tolerances of the optical axis with respect to the semiconductor light-emitting device and lens system increase since the core region in the input face enhances, thereby yielding the effect of facilitating the assembling of the light-emitting module together with these members, in addition to the effects mentioned above.

A second embodiment of the optical fiber and optical fiber amplifier in accordance with the present invention will now be explained.

Figure 8:
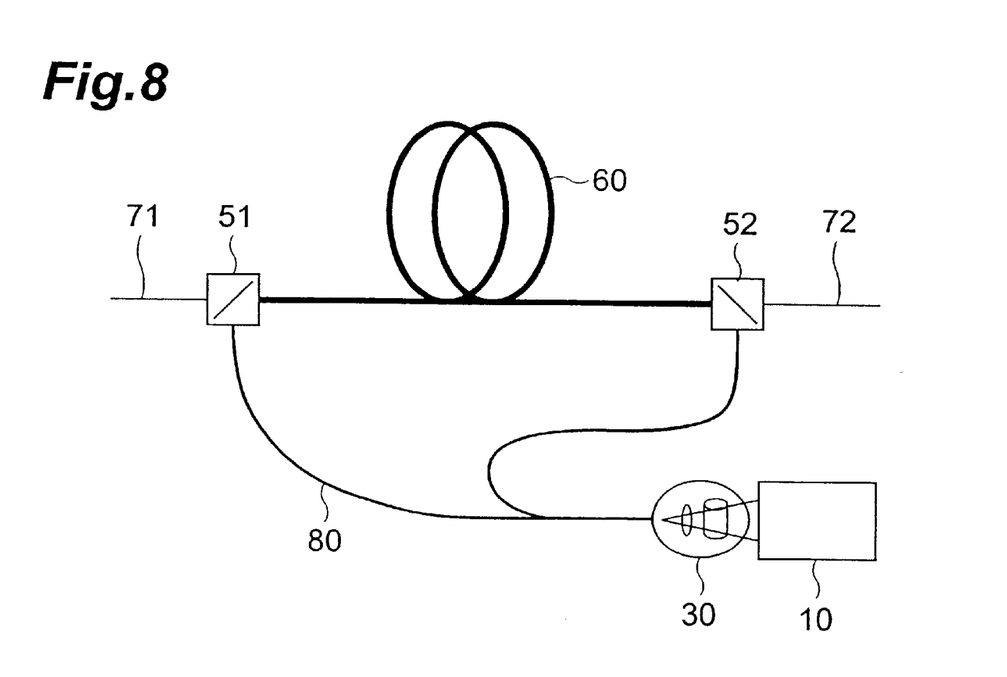
FIG. 8 is a configurational view showing a second embodiment of the optical fiber amplifier in accordance with the present invention.

FIG. 8 is a configurational view of the optical fiber amplifier in accordance with the second embodiment. The optical fiber amplifier in accordance with this embodiment differs from that of the first embodiment in that an optical fiber 80 shown in FIGS. 9A and 9B is used in place of the optical fibers 20 to 22 and the 3-dB coupler 40.

Figure 9A:
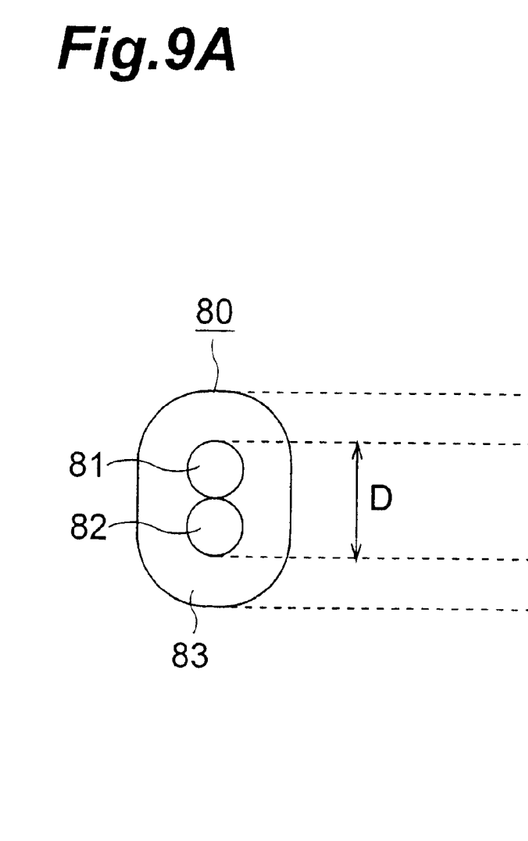
FIGS. 9A and 9B are views showing an end face and vertical cross-sectional structure of an optical fiber in accordance with the present invention employed in the apparatus of FIG. 8, respectively.
Figure 9B:
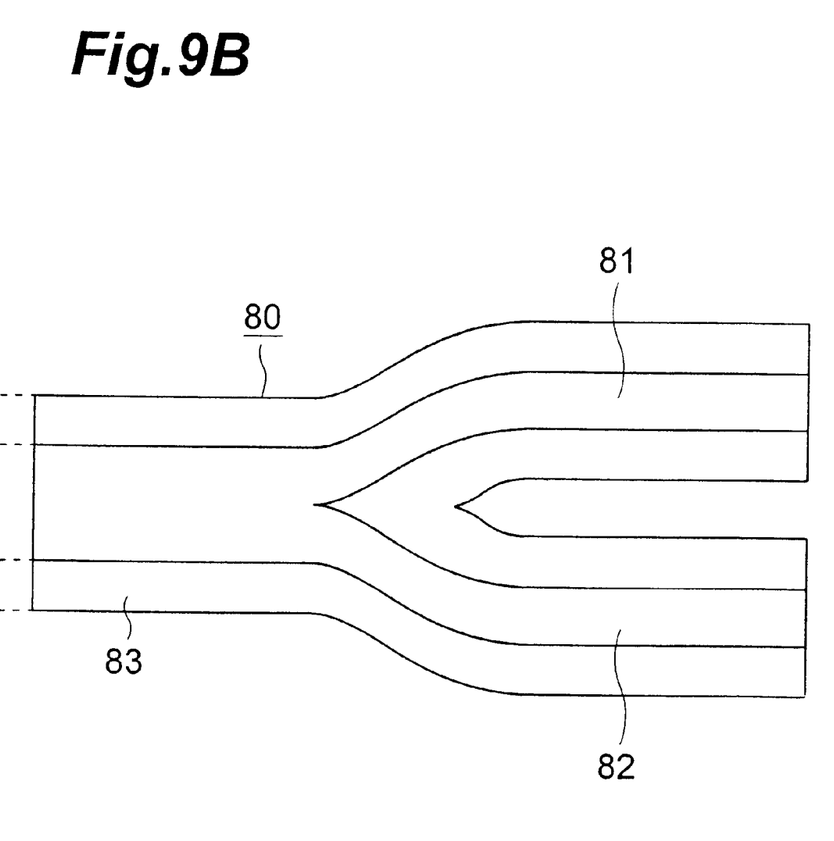

FIGS. 9A and 9B are schematic views showing the input end face and vertical cross section of the optical fiber 80, respectively. Such an optical fiber 80 is made by preparing two optical fibers, arranging them such that they align with each other at one end with their optical axes being parallel to each other, and heating their respective parts of regions on the aligning end face side which are brought into contact with each other, so that the core regions on this one end side are in contact or unified with each other, and this part is used as an input face. At the input face of the optical fiber 80, as shown in FIG. 9A, core regions 81 and 82 are in contact or unified with each other, and are surrounded with a cladding region 83. At a point separated from the input face of the optical fiber 80 by a predetermined distance or farther, the two core regions 81 and 82 are separated from each other as shown in FIG. 9B, and the cladding region 83 is also divided into two at a farther point. Hence, the optical fiber 80 would have two output faces.

In this optical fiber 80, the width of the whole core region in the direction connecting the respective centers of the core regions 81 and 82 in the input face is taken as D. If the relationship between the maximum width L of the output face of the light-emitting region of the semiconductor light-emitting device and the core width D of the optical fiber 80 satisfies the relationships of the above-mentioned equations (1) and (2), then the light input into the optical fiber 80 from the semiconductor light-emitting device so as to be guided therethrough will have a high power, and the light intensity in the optical fiber 80 will be sufficient.

The optical fiber 80 in this optical fiber amplifier receives via its input face the pumping light emitted from the semiconductor light-emitting device 10 and collected by the lens system 30, guides the pumping light through each of the core regions 81 and 82, and outputs thus guided pumping light to WDM couplers 51, 52 from two output faces, respectively.

Even when the length L of the longer side of the output face of the light-emitting region 11 in the semiconductor light-emitting device 10 is long and the optical output power is high, the pumping light emitted from the semiconductor light-emitting device 10 is efficiently input into the optical fiber 80, so as to be efficiently supplied to the amplifying optical fiber 60, and the light intensity becomes sufficient in the optical fiber amplifier in accordance with this embodiment as well. Therefore, the optical amplification factor of signal light in the amplifying optical fiber 60 is high. Also, in this embodiment, unlike the first embodiment, it is not necessary to provide the 3-dB coupler, whereby the pumping light emitted from the semiconductor light-emitting device 10 can be supplied to the amplifying optical fiber 60 further efficiently.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

Since both high optical power output and light intensity can be attained at the same time, the optical fiber and light-emitting module in accordance with the present invention can be favorably used not only in the optical fiber amplifier in accordance with the present invention, but also for pumping and processing in optical fiber lasers, and in medical lasers.

What is claimed is:

1. An optical fiber consisting of silica-based glass wherein a core cross section at an end face has a maximum width of 50 $\mu$m or less, and wherein the product of said maximum width and a numerical aperture thereof is 5.2 $\mu$m or greater.

2. An optical fiber having two core portions, the product of the maximum width of a core cross section at an end face and a numerical aperture thereof in each of said core portions being 2.6 $\mu$m or less, said two core portions being provided with respective cladding portions independent from each other at one end thereof, and at the other end thereof said two core portions being disposed at least near or adjacent to each other and provided with a common cladding portion, the maximum distance between outer peripheries of said two core portions being 50 $\mu$m or less.

3. A light-emitting module comprising:
   a semiconductor light-emitting device for emitting light having a predetermined wavelength;
   a light-collecting optical system for collecting the light emitted from said semiconductor light-emitting device; and
   an optical fiber for receiving the light guided by said light-collecting optical system, guiding thus received light through a core region, and emitting thus guided light, said optical fiber being disposed such that a maximum width direction of the core region at an input face thereof aligns with a maximum width direction of an incident beam, the maximum width D [$\mu$m] of said core region at the input face being not greater than the maximum width L [$\mu$m] of a light-emitting region of said semiconductor light-emitting device.

4. A light-emitting module according to claim 3, wherein said optical fiber satisfies $$\frac{L\sin\theta}{NA} \leq D$$

where NA is the numerical aperture, and $\theta$ is the output divergent angle of the emitted light in the maximum width direction of the light-emitting region of said semiconductor light-emitting device.

5. An optical fiber amplifier comprising:
   an amplifying optical fiber for optically amplifying signal light according to pumping light incident thereon;
   a semiconductor light-emitting device for emitting said pumping light;
   a light-collecting optical system for collecting the light emitted from said semiconductor light-emitting device; and
   a waveguide optical fiber for receiving the light guided by said light-collecting optical system and guiding thus received light through a core region to said amplifying optical fiber, said waveguide optical fiber being disposed such that a maximum width direction of the core region at an input face thereof aligns with a maximum width direction of an incident beam, the maximum width D [μm] of said core region at the input face being not greater than the maximum width L [μm] of a light-emitting region of said semiconductor light-emitting device.

6. An optical fiber amplifier according to claim 5, wherein said waveguide optical fiber satisfies $$\frac{L\sin\theta}{NA} \leq D$$

where NA is the numerical aperture, and θ is the output divergent angle of the emitted light in the maximum width direction of the light-emitting region of said semiconductor light-emitting device.

7. An optical fiber amplifier according to claim 5, wherein said amplifying optical fiber has a double cladding segment and satisfies D'×NA'≧D×NA where D'[μm] is the diameter of the inner cladding, and NA' is a numerical aperture thereof.

8. An optical fiber according to claim 1, wherein said core is mainly doped with Ge.

9. An optical fiber according to claim 1, wherein said maximum width of core cross section at the end face is 18 μm or less.

10. An optical fiber according to claim 1, wherein said fiber guides the multimode light.

11. An optical fiber according to claim 1, wherein a core cross section at middle section has a maximum width of 50 μm or less, and wherein the product of said maximum width and a numerical aperture thereof is 5.2 μm or greater.

12. An optical fiber according to claim 1, wherein a core cross section at both end face has a maximum width of 50 μm or less, and wherein the product of said maximum width and a numerical aperture thereof is 5.2 μm or greater.

13. A light-emitting module according to claim 3, wherein said maximum width L is 50 μm or greater.

14. A light-emitting module according to claim 3, wherein the maximum width L'[μm] of incident beam to said optical fiber emitted from said light-collecting optical system is not greater than said maximum width D [μm].

15. An optical fiber amplifier module according to claim 5, wherein the maximum width L is 50 μm or greater.

16. An optical fiber amplifier module according to claim 5, wherein the maximum width L'[μm] of incident beam to said amplifying optical fiber emitted from said light-collecting optical system is not greater than said maximum width D [μm].

17. An optical fiber amplifier module according to claim 5, wherein said amplifying optical fiber comprises of a core rejection with a refractive index of $n_1$, a first cladding region surrounding said core region with a refractive index of $n_2$, and a second cladding region surrounding said first core region with a refractive index of $n_3$, the relation $n_1 > n_2 > n_3$ holds, and said first cladding region has a region for propagating the mutimode light.

18. An optical fiber amplifier module according to claim 5, wherein said optical fiber satisfies $$\frac{L\sin\theta}{NA} \leq D$$

where NA is the numerical aperture, and θ is the output divergent angle of the emitted light in the maximum width direction of the light-emitting region of said semiconductor light-emitting device.

19. An optical fiber amplifier module according to claim 5, where said amplifying optical fiber has the maximum width of the core region at the output face equal to said maximum width [μm] and the numerical aperture at the output face equal to said NA at input face.

* * * * *